C. B. ADAMS.
DRAWER PULL.
APPLICATION FILED JUNE 2, 1909.
934,258.  Patented Sept. 14, 1909.
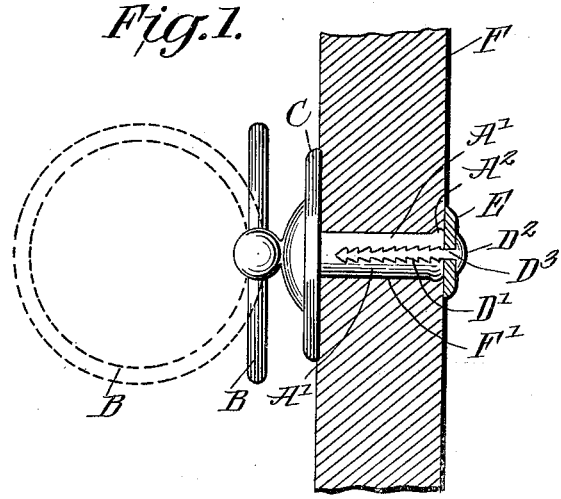
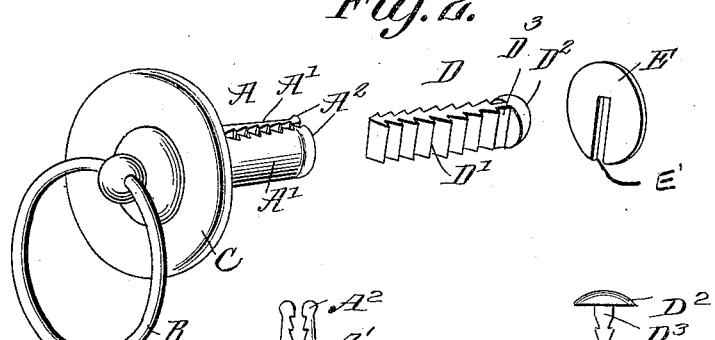
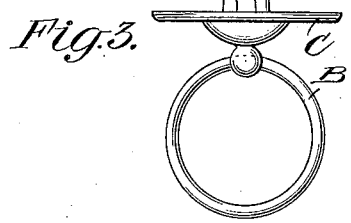
WITNESSES
Samuel E. Wade
Perry B. Turpin
INVENTOR
CORNELE B. ADAMS
BY Munn & Co.
ATTORNEYS

UNITED STATES PATENT OFFICE.

CORNELE BERRIEN ADAMS, OF NEW ORLEANS, LOUISIANA.

DRAWER-PULL.

934,258.

Specification of Letters Patent. Patented Sept. 14, 1909.

Application filed June 2, 1909. Serial No. 499,748.

*To all whom it may concern:*

Be it known that I, CORNELE BERRIEN ADAMS, a citizen of the United States, and a resident of New Orleans, in the parish of Orleans and State of Louisiana, have made certain new and useful Improvements in Drawer-Pulls, of which the following is a specification.

This invention is an improvement in bolts designed especially for use on drawer pulls and the like although it is capable of use in other cases where bolts are put through wood or other elastic material; and the invention consists in certain novel constructions and combinations of parts as will be hereinafter described and claimed.

In the drawing Figure 1 is a side view of my invention as in use, the parts being shown in section, and Fig. 2 is a detail perspective view of the bolt with the parts detached. Fig. 3 is a detail side view of the bolt, and Fig. 4 is a detail side view of the key pin.

In the construction shown, the bolt A has a pull B, and a head C, which latter is designed to abut the drawer, door or other construction to which the invention is designed to be applied. The bolt A, is split from its inner end and is provided on the inner side of the arms A' so formed with ratchet teeth which produce a longitudinal slit within the bolt adapted to receive the key pin D, which is serrated to fit the longitudinal slit in the bolt and to be applied thereto as shown in Fig. 1 of the drawing. The pin is also wedge-shaped at the end or point in order to force open the split bolt and increase the facility with which the pin may be driven in place. The key pin D, therefore, is provided with the serrations D', and has at its outer end a head D², and is provided adjacent to said head with a flattened shank D³ to receive the locking washer E, which latter is slotted at E' from one edge and adapted to slide upon the flattened shank of the key pin D when the parts are applied as shown in Fig. 1 of the drawing.

This construction permits the washer to be applied as shown in Fig. 1, after the key pin has been driven into the split bolt and the washer will then operate to lock the bolt positively in position and can be conveniently removed when it is desired to withdraw the bolt.

The key pin D is so formed as to engage with any desired serrations of the arms A' of the bolt, which construction renders the bolt adaptable to different thicknesses of board within wide limits without affecting the finish at both the inner and outer faces of the board to which the bolt may be applied.

Manifestly, it is not necessary to make the bolts of spring material but any ordinary metal possessing sufficient resilience to permit the slight expansion of the arms A' when the key is driven therebetween.

The form of drawer pull B or other head at the outer end of the bolt A may be varied as to design and finish to suit the purpose for which the bolt is intended or the taste of the prospective user.

When applied to the drawer preliminary to inserting the key pin, the bolt arms may be as shown in Fig. 3, and it will be noticed that in this figure the arms are divided throughout their length, while in Fig. 1, the slit only extends to a point near the outer end of the bolt.

It is evident that the split bolt must expand temporarily while the pin D is being driven, to the extent of the depth of the teeth on each side of the pin, and as the teeth finally interlock the diameter of the bolt assumes its normal position, which is intended to be cylindrical when the parts are connected as shown in Fig. 1 of the drawing.

The end of the split bolt A is provided with an enlargement or bead A², around its inner end, that is intended to be forced slightly into the wood as the pin is driven, thereby insuring a constant pressure to prevent the possibility of the teeth becoming disengaged. These beaded ends are made to be in contact until opened by the insertion of the pin, so as to bring the diameter of this end of the bolt down to the size of the hole previous to insertion.

I claim—

1. A bolt for drawer pulls and the like comprising a bolt split from one end and having the arms so formed provided on their inner faces with serrations, and on their outer sides at their extremities with beads, a key pin serrated to correspond and interlock with the serrations of the bolt arms, the said key pin having at its outer end a head and adjacent thereto a shank portion, and a washer slotted to fit said shank portion, all substantially as and for the purposes set forth.

2. A bolt for drawer pulls and the like comprising a bolt proper split from one end forming arms serrated on their inner faces, a key pin to operate between said arms and serrated in conformity thereto, and provided with a head and with a shank portion adjacent thereto, and a washer to fit said shank portion, substantially as set forth.

3. A bolt for drawer pulls and the like comprising a bolt proper split from one end forming arms, a key pin to operate between said arms, the arms and key pin having interlocking portions, and a washer fitted removably to the key pin, substantially as set forth.

4. A bolt for drawer pulls and the like comprising a bolt proper having a split end forming arms serrated on their inner faces, a key pin to coöperate with said arms, and a stop fitted removably to said key pin.

CORNELE BERRIEN ADAMS.

Witnesses:
B. Y. WOLF,
H. HOFFMANN.